Aug. 28, 1956   E. MUNZ   2,760,873
PROCESS OF TRANSPORTING CANS THROUGH A CONTINUOUS STERILIZER
Filed May 5, 1951   3 Sheets-Sheet 1

INVENTOR:
Emil Munz
BY
Richard Lein
ATTORNEYS

Aug. 28, 1956  E. MUNZ  2,760,873
PROCESS OF TRANSPORTING CANS THROUGH A CONTINUOUS STERILIZER
Filed May 5, 1951  3 Sheets-Sheet 2

INVENTOR
Emil Munz
BY
ATTORNEYS

Aug. 28, 1956  E. MUNZ  2,760,873
PROCESS OF TRANSPORTING CANS THROUGH A CONTINUOUS STERILIZER
Filed May 5, 1951  3 Sheets-Sheet 3

INVENTOR
Emil Munz
BY
ATTORNEYS

United States Patent Office 2,760,873
Patented Aug. 28, 1956

2,760,873

PROCESS OF TRANSPORTING CANS THROUGH A CONTINUOUS STERILIZER

Emil Munz, Bottighofen, Thurgau, Switzerland

Application May 5, 1951, Serial No. 224,851

4 Claims. (Cl. 99—214)

This invention relates to a procedure to transport cans in a continuous steriliser as well as the equipment to carry out the procedure.

The transport of cans in a continuous steriliser, as well as the feeding and discharging mechanisms have until today been carried out by mechanical means, such as chains, belts, cables, drums etc. This means of transportation has always led to serious breakdowns and interruptions of the process. Especially the jamming of cans either in the valve system or the transport system happened very frequently. In all cases it was necessary to interrupt the sterilising procedure and, if necessary, open up the steriliser.

The purpose of this invention is to eliminate these disadvantages.

The invention relates to a special system of transporting cans in continuous sterilisers, as well as the conveyance to and from the autoclave. It is distinguished by the fact that at least one part of the way of conveyance is done by means of a pipe system in which the cans are transported by a circulating liquid.

A special sector of the invention relates to an equipment in which the fluid circulates in an uninterrupted circle through the whole system. In the region of the sterilisation, heat is continuously introduced into the fluid which in turn heats up the can to the desired temperature. The cans can be carried in horizontal (rotating), vertical (non-rotating) or partly rotating position, thus allowing adjusting the procedure to the particular kind of product to be sterilized.

Expediently the temperature of the fluid in the discharge pipe system is regulated in such a manner that the decreasing pressure curve of the fluid corresponds with the one of the can content, in order that no large excess pressure is executed upon the can.

The enclosed drawings Figs. 1–5 show different examples of application.

Figure 1:
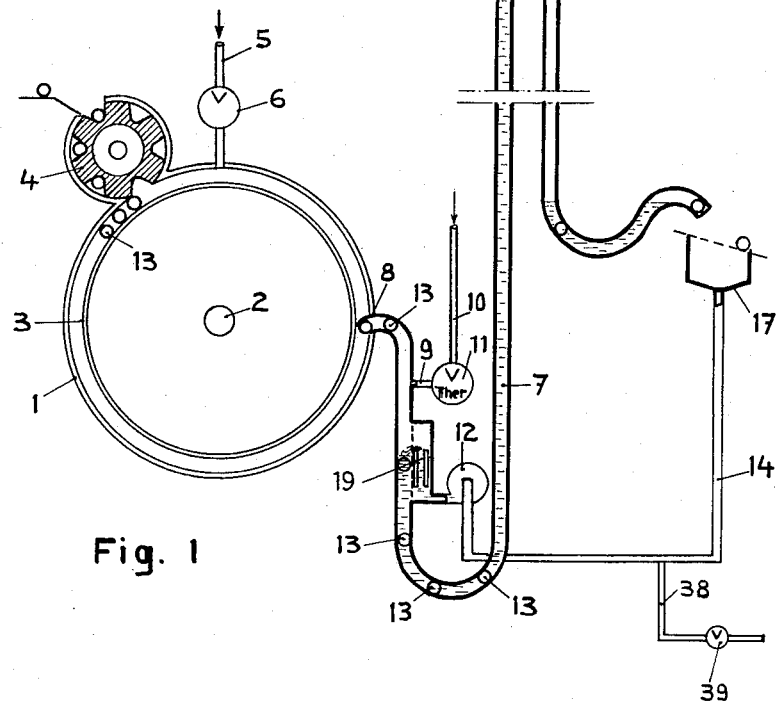

The example according to Fig. 1 shows the rotative type of continuous autoclave 1 in combination with the new discharge system. A horizontal axis 2 rotates the drum 3 having attachments not shown in the drawing which carry the cans in spiral manner towards the outlet 8. The cans are introduced by means of a valve 4. The steam is introduced by a pipe line 5 and regulated by a valve 6.

The discharge system consists of a pipe line with several U-turns 7, being fixed to the continuous autoclave. It is of such dimension that the can approximately fits the interior dimension of the pipe. Above the fluid level air is introduced by pipe 10 and regulated by a thermostat 11. The water is introduced into the system by a pump 12. A floating system adjusts the level of the incoming stream to the fluid level in the pipe 7 in order to obtain a smooth liquid surface at the point where steam condensation could occur.

From the foregoing description one readily can understand the functioning of the equipment. The cans enter at valve 4, are sterilized in the autoclave 1 and are carried by drum 3 to the discharge end 8 of the cooker and enters there the pipe system 7, where they are carried by the fluid into the discharge end, being at the same time cooled to a temperature which permits the following open cooling. The fluid is separated from the cans at the discharge end 17 and led by the pipe 14 to the pump 12. Cool water is introduced through pipe 38 and the amount regulated by a thermostat 39 according to fluid temperature of the circulating liquid.

Figure 2:
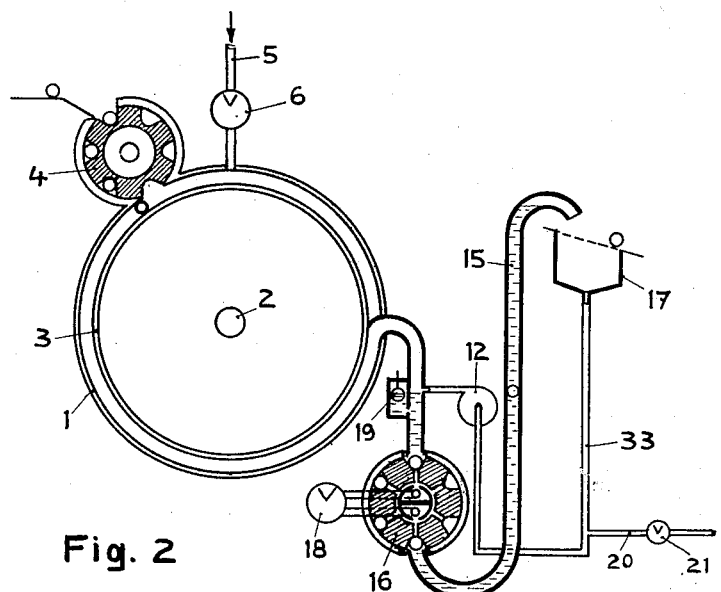

Another example is shown in Fig. 2. Similar parts are designated with the same numbers. In this system a valve 16 reduces the pressure, allowing that a shorter fluid column 15 can be made to counteract the steam pressure inside the autoclave. The water level is adjusted to the level of the incoming water stream from pump 12 by means of a floating bulb 19 which regulates the valve 18.

Figure 3:
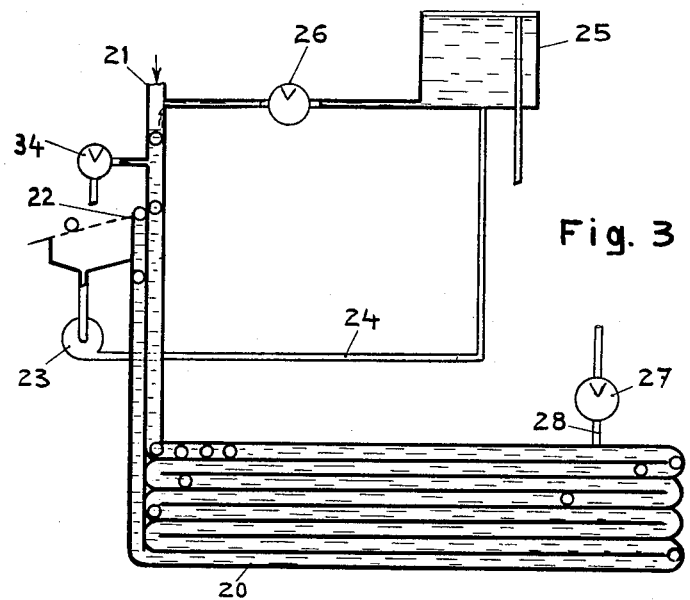

Another example is shown in Fig. 3. In this system the whole autoclave consists of a pipe system 20. Inlet and discharge ends 21 and 22 respectively are built as the vertical elongations of this system. Pump 23 carries the discharging liquid through pipe 24 into the tank 25. The tank again is connected with the inlet 21 of the autoclave. The amount of inflowing water is regulated by valve 26. The current in the system is maintained by the higher liquid level in inlet pipe. In order to adjust the circulating water stream to the changing number of passing cans, a connection is introduced between inlet and outlet. A valve 26 discharges the corresponding amount of water to the number of incoming cans directly to the outlet 22. In this way the time during which the cans travel through the steriliser is dependent upon the number of cans entering the machine. Heating of the fluid is brought about by injecting steam into the liquid at the very moment the cans enter the horizontal part of the pressure cooker. A steam valve 27 regulates the steam inlet in dependence of the temperature of the circulating fluid.

Heating can also occur indirectly, by heating up the walls of the pipe system.

In this system the cans can be transported in horizontal (rotating) or vertical (non-rotating) position, or both.

Inlet and outlet pipes are connected together in such a manner that the liberated heat of the discharging fluid, whilst its pressure is continuously decreased, can be transferred to the fluid of the inlet pipe.

The optimal height of the inlet column is dependent upon the optimal cooking temperature to be reached, as well as upon the capacity of the cooker.

Figure 4:
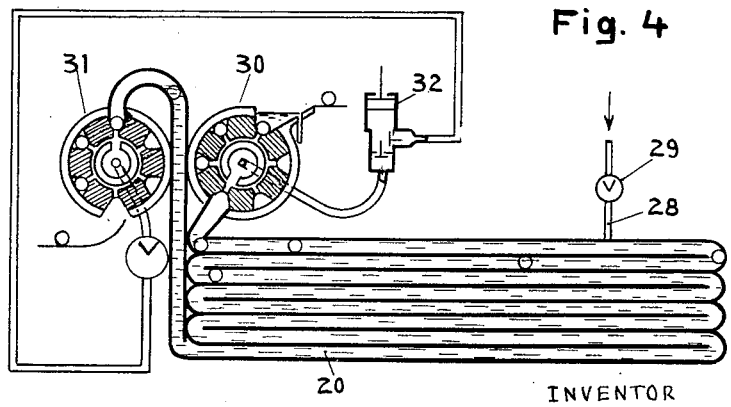

A variant of this system is shown in Fig. 4. Here again the pressure cooker is represented by a pipe system 20 which is heated up by a steam pipe 28 the temperature of which is regulated by a valve 29.

Inlet and outlet are regulated by means of valves 30 and 31. The fluid is circulated by means of a pump 32. The operation is the same as the one described in Fig. 3.

Figure 5:
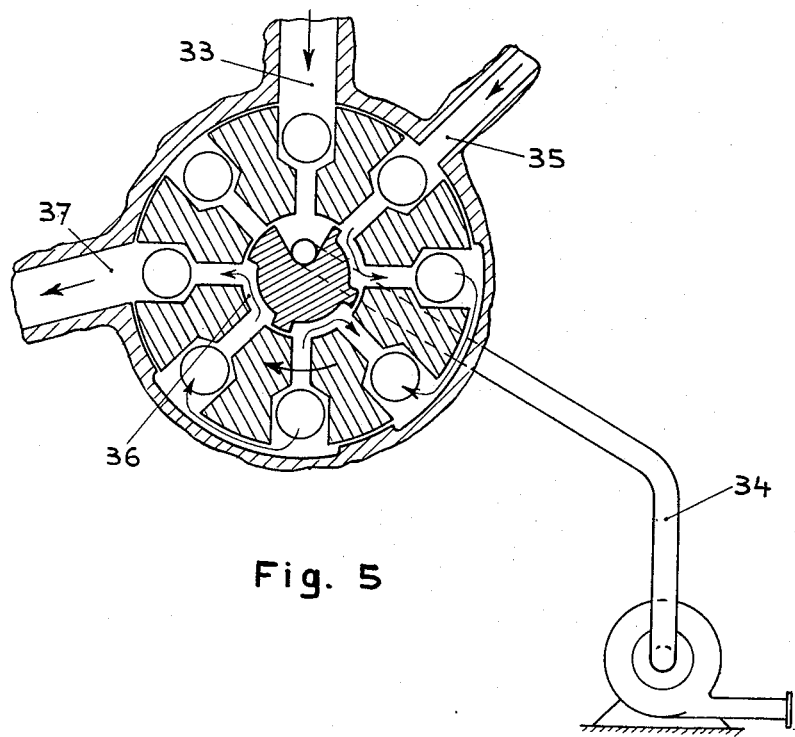

Again a variant of Fig. 3 is shown in Fig. 5. In this figure the outlet valve is constructed in such a manner that cooling under pressure can be brought about. The cans enter in position 33 of valve 31. The hot fluid is discharged through pipe 34 to pump 32. Cold water is introduced through inlet 35. It is circulated through the valve, has to pass a narrow place at 36 and is discharged at outlet 37 with the cans.

What I claim is:

1. A continuous method of sterilizing products in sealed receptacles, said method comprising introducing the receptacles one by one from an entry zone into a steam zone, heating the material in the receptacles in said steam zone to a sterlizing temperature, passing the receptacles into a continuous current flowing in a receptacle processing zone, forcing the receptacles through said receptacle processing zone by said current while maintaining in the receptacle processing zone such a hydraulic head of liquid that the pressure of the steam zone is counter-balanced by said hydraulic head, and adjusting the temperature of said current of liquid in such manner that the pressure balance between the receptacles and the liquid head is maintained, and discharging the receptacles at atmospheric pressure from said current of liquid.

2. A continuous method of sterilizing products in sealed receptacles, said method comprising introducing the receptacles one by one from an entry zone into a steam zone, heating the material in the receptacles in said steam zone to a sterilizing temperature, deflecting the receptacles from said steam zone through a connecting zone into a receptacle processing zone, forcing the receptacles through said receptacle processing zone by the current of a liquid while maintaining in the receptacle processing zone such a hydraulic head of liquid that the pressure of the steam zone is counter-balanced by said hydraulic head, adjusting the temperature of said current of liquid in such manner that the pressure balance between receptacles and liquid head is maintained and discharging the receptacles at atmospheric pressure from said current of liquid.

3. A continuous method of sterilizing products in sealed receptacles, said method comprising introducing the receptacles one by one from an entry zone into a steam zone, heating the material in the receptacles in said steam zone to a sterilizing temperature, deflecting the receptacles from said steam zone through a connecting zone wherein the ambient is air to prevent hammer and steam condensation, said connecting zone connecting the steam zone with a receptacle processing zone, maintaining a super-atmospheric pressure gradient between said connecting zone and said receptacle processing zone, passing the receptacles into a continuous current of heated liquid in said receptacle processing zone at a given superatmospheric pressure common to the entire zone, forcing the receptacles through said receptacle processing zone by the current of said liquid while maintaining in the receptacle processing zone such a hydraulic head of liquid that the pressure of the steam zone is counterbalanced by said hydraulic head, adjusting the temperature of said current of liquid in such manner that the pressure balance between receptacles and liquid head is maintained, and discharging the receptacles at atmospheric pressure from said current of liquid.

4. In a continuous method of sterilizing products in sealed receptacles, the steps of introducing the receptacles into a continuous current flowing in a receptacle processing zone, forcing the receptacles through said receptacle processing zone by said current while maintaining in the receptacle processing zone such a hydraulic head of liquid that at least the vapor pressure of the liquid is counterbalanced and the pressure generated in the receptacles is balanced by said hydraulic head, and discharging the receptacles at atmospheric pressure from said current of liquid.

References Cited in the file of this patent

UNITED STATES PATENTS

| | | |
|---|---|---|
| 1,184,252 | Luhrmann et al. | May 23, 1916 |
| 1,252,302 | Riesenecker | Jan. 1, 1918 |
| 1,570,236 | Fooks | Jan. 19, 1926 |
| 1,754,584 | Thompson | Apr. 15, 1930 |
| 2,472,970 | Hanna | June 14, 1949 |